United States Patent [19]
Laughlin et al.

[11] Patent Number: 5,352,510
[45] Date of Patent: Oct. 4, 1994

[54] METHOD FOR CONTINUOUS MANUFACTURE OF FOAM BOARDS WITH ISOCYANATE-IMPREGNATED FACERS

[75] Inventors: Wayne E. Laughlin, Gulfport; Kenneth P. Klapper, Palm Harbor, both of Fla.

[73] Assignee: The Celotex Corporation, Tampa, Fla.

[21] Appl. No.: 126,864

[22] Filed: Sep. 27, 1993

[51] Int. Cl.$^5$ ............................................. C08G 18/08
[52] U.S. Cl. .................................... 428/304.4; 427/209; 427/339; 427/340; 427/373; 428/311.1; 428/425.1
[58] Field of Search ............... 428/304.4, 311.1, 425.1; 427/209, 339, 340, 373, 389.9, 392, 393

[56] References Cited

U.S. PATENT DOCUMENTS

| | | | |
|---|---|---|---|
| 3,533,901 | 10/1970 | Sutker | 161/160 |
| 4,025,687 | 5/1977 | Wooler et al. | 428/310 |
| 4,169,915 | 10/1979 | Heitmann et al. | 428/310 |
| 4,204,019 | 5/1980 | Parker | 428/310 |
| 4,212,917 | 7/1980 | Skowronski et al. | 428/310 |
| 4,366,204 | 12/1982 | Briggs | 428/304.4 |
| 4,572,865 | 2/1986 | Gluck et al. | 428/309.9 |
| 4,756,860 | 7/1988 | Hooper et al. | 264/45.8 |
| 4,764,420 | 8/1988 | Gluck et al. | 428/317.7 |
| 4,879,164 | 11/1989 | Younes | 428/209 |
| 5,008,359 | 4/1991 | Hunter | 527/103 |
| 5,140,086 | 8/1992 | Hunter et al. | 527/103 |
| 5,204,176 | 4/1993 | Seiss et al. | 428/304.4 |
| 5,220,760 | 6/1993 | Dimakis | 52/309.9 |

*Primary Examiner*—Maurice J. Welsh
*Attorney, Agent, or Firm*—Charles W. Vanecek

[57] ABSTRACT

A method for the manufacture of paper faced foam which comprises (a) applying a foam-forming mixture to at least one advancing cellulosic sheet or composite thereof with an air- and/or moisture-impermeable material, the cellulosic sheet (i) being impregnated with cured polyisocyanate, (ii) being sufficiently flexible for unwinding from a roll for conveyance along a production line and (iii) having a moisture content which does not exceed about 10 percent and is evenly distributed throughout the cellulosic sheet, and (b) foaming and curing the faced foam-forming mixture.

29 Claims, 2 Drawing Sheets

METHOD FOR CONTINUOUS MANUFACTURE OF FOAM BOARDS WITH ISOCYANATE-IMPREGNATED FACERS

BACKGROUND OF THE INVENTION

1. Field of the Invention

This invention relates to a method for continuously producing a rigid plastic foam insulation board having on at least one major surface thereof a cellulosic facing member which has been impregnated with polyisocyanate.

2. Description of the Art

The usefulness of foamed plastics is well known. The rigid types, because of their especially good thermal insulation properties, find extensive application in the manufacture of laminated articles for the building industry.

These laminated articles can be made continuously or discontinuously, for example, batchwise in a mold. In either case, the, process usually involves deposition of a foam-forming mixture onto a facing sheet and bringing a second such sheet into contact with the mixture before formation of the finished article.

Particularly suitable facing sheets for such laminates from the standpoint of their inexpensiveness and ease of handling are cellulosic materials. The production of paper-faced rigid foams is described in many patents, e.g., U.S. Pat. Nos. 3,686,047, 3,903,346, 3,940,517, 4,121,958, 4,292,363, 4,366,204, and 4,764,420.

Recent U.S. Pat. Nos. 5,008,359 and 5,140,086 describe the production of polyisocyanate-impregnated cellulosic materials, and U.S. Pat. No. 5,204,176 discloses the use of such materials to form relatively rigid and strong hydrophobic sheets as siding layers for structural siding products. The sheets are said to provide weather protection, impact resistance and wind penetration resistance to a structure, and to contribute to its racking strength. Structural siding products made with the sheets can substitute for the conventional let-in braces, plywood or oriented strandboard corner sheeting used to furnish racking strength in building structures, thus saving time, labor and expense in construction.

It would be a considerable advance in the art to provide a method for the continuous production of a rigid foam insulation board which is faced with cellulosic material having a full range of facer properties desired in the art, including strength akin to that of U.S. Pat. No. 5,204,176's siding layers but without their rigidity.

OBJECTS OF THE INVENTION

It is therefore an object of the present invention to provide an improved method for the continuous production of a rigid foam plastic faced with at least one polyisocyanate-impregnated cellulosic material in a simple and economical manner.

It is another object of the present invention to produce a rigid foam laminate having a polyisocyanate-impregnated cellulosic facing sheet which provides improved racking strength, particularly at building corners, and a combination of other advantageous properties for building constructions, including durability, dimensional stability, and good handleability.

It is a further object of the present invention to provide a flexible polyisocyanate-impregnated cellulosic material which can be fed from a roll in both free- and restrained-rise processes to form a facing for a rigid foam insulation board.

It is yet another object of the present invention to provide for the high speed production of thermoset foam laminates faced with polyisocyanate-impregnated cellulosic material, particularly laminates of rigid polyurethane and polyisocyanurate foam, which exhibit overall good properties, including superior facing sheet adhesion, dimensional stability, strength properties, and insulating value.

These and other objects and advantages of the present invention will become more apparent to those skilled in the art when the instant disclosure is read in conjunction with the accompanying drawings.

SUMMARY OF THE INVENTION

Figure 1:
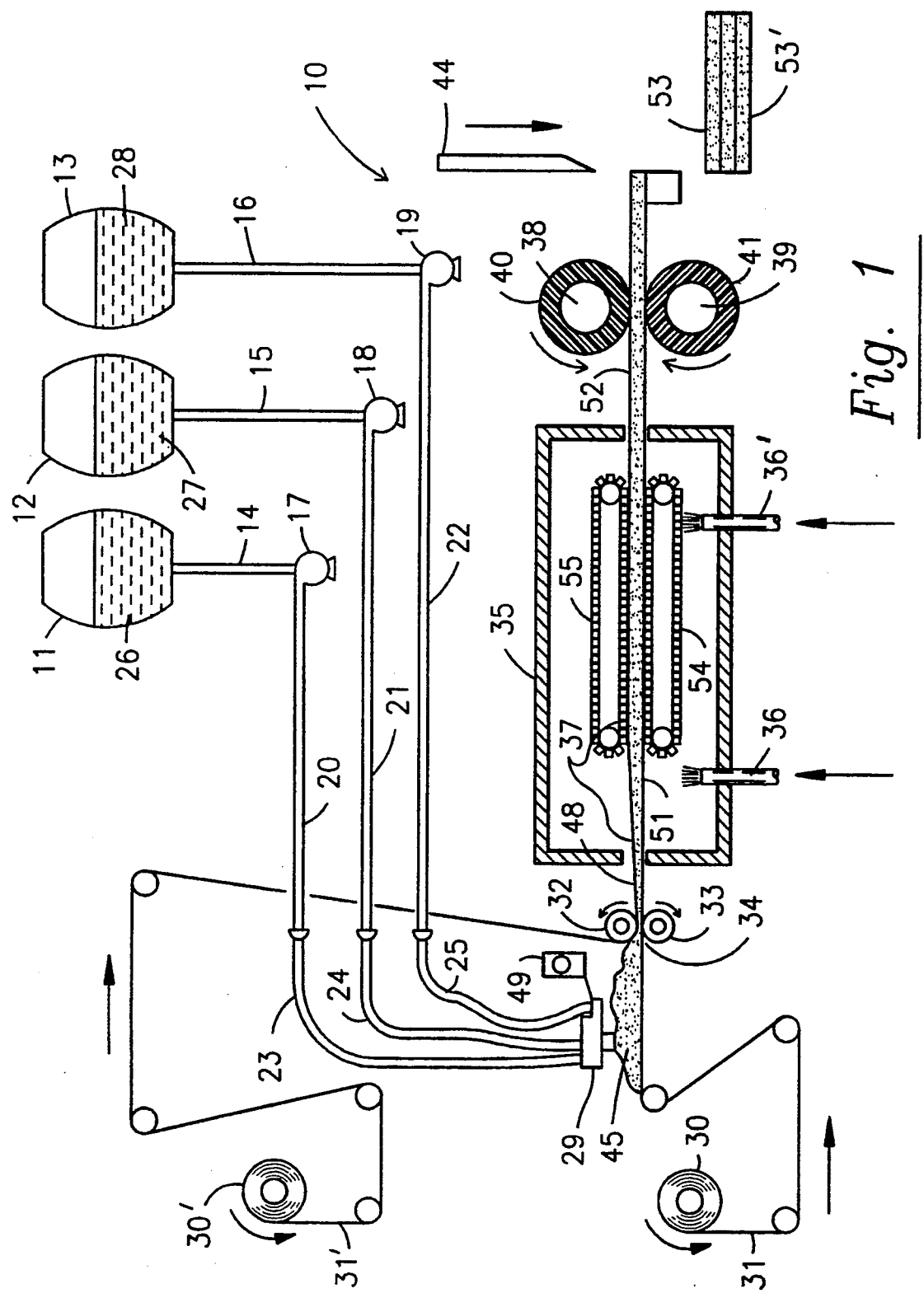
FIG. 1 is a schematic elevation of an apparatus suitable for practicing the process of the invention in a restrained-rise mode.

The above objects were achieved through the method of the present invention which relates to the high speed production of thermoset foam laminates, whose foam core is covered or faced by at least one polyisocyanate-impregnated sheet of cellulosic material. The laminating method is suitably carried out by bringing at least one such cellulosic sheet into contact or close proximity with a foam-forming mixture on a conveyor, and thereafter conveying together the composite of sheet and foamable mixture and foaming the mixture to produce the foam laminate of the invention.

The sheet of cellulosic material is supplied in continuous form from a roll. The sheet is sufficiently flexible so that it can be readily wound on the roll but it still possesses marked toughness making it especially resistant to damage during foam laminate production and subsequent utilization in end use applications in the construction market. It is the particular advantage of the present invention that a lightweight foam laminate can be produced using relatively thin, flexible facing sheets (e.g., less than 30 mils thick) which can be fed from rolls in the same way as the paper facing sheets of the prior art. The strength achievable by facing a foam core with the cellulosic sheet or sheets of the invention makes the finished foam laminate especially suitable for bracing the framework of a building. The superior strength of the cellulosic sheet derives from its treatment by the polyisocyanate. Unlike past linerboards whose strength was improvable only at the cost of flexibility, the inventive sheets have both high compressive, tensile and tearing strength and sufficient flexibility for application from a roll in a high speed foam laminate production line.

Any cellulose material may be treated with isocyanate in the formation of the facing sheets of the invention. Examples are cellulosic fiber material such as bleached or unbleached kraft paper or linerboard, or other paper products, chemical or thermomechanical pulp sheets or mats. The moisture content of the cellulose prior to impregnation is generally no greater than about 10 weight %, based on the weight of the cellulose. The cellulose is desirably in the form of a sheet for impregnation by the polyisocyanate, which can be applied to one or preferably both sides of the cellulosic sheet by various means, including spraying, dipping, or rolling. The application can be profitably accomplished on a continuous production line.

The isocyanates used for the impregnation are suitably diisocyanates, although tri- or higher functionality isocyanates may be used. The polyisocyanate may be applied in the form of a non-reactive adduct of the polyisocyanate and a blocking agent. The adduct is subsequently decomposed during the treatment to free the polyisocyanate for reaction with the cellulose. The polyisocyanate can be applied in a neat condition or in a solvent and the impregnation step can be catalyzed or uncatalyzed. The impregnation of the cellulosic material and curing of the impregnated material may be carried out in any suitable manner described in the prior art literature, such as by the methods disclosed in U.S. Pat. Nos. 5,140,086 and 5,220,760, which patents are incorporated herein by reference.

The impregnated and cured cellulosic sheet in rolled form is rotatably mounted on a stand from which it is unrolled to be brought into contact with the foam-forming composition. Foamable plastic materials which may be used in the production of the laminated articles of the invention may be any such materials described in the prior art. Examples of these materials are polystyrene, polyvinyl chloride, polyethylene, polypropylene, polyacrylonitrile, polybutadiene, polyisoprene, polytetrafluoroethylene, polyesters, melamine, urea, phenol resins, silicate resins, polyacetal resins, polyepoxides, polyhydantoins, polyureas, polyethers, polyurethanes, polyisocyanurates, polyimides, polyamides, polysulphones, polycarbonates, and copolymers and other polymeric types. While the foams may be rigid, semi-rigid or flexible, the invention finds greatest utility when the foamed plastic is the rigid type used in constructional articles, especially rigid polyurethane and polyisocyanurate foams.

DETAILED DESCRIPTION OF THE INVENTION

The present invention provides a convenient and economic method for continuously forming a structural laminate having a plastic foam core and at least one facing sheet comprising a polyisocyanate-impregnated cellulosic material. The prefoam chemicals are brought in contact with the cellulosic sheet or a composite including the sheet which is being continuously advanced along a production line, and are allowed to foam to a completely expanded state. The method advantageously comprises conveying a lower facing material along a production line; applying a foam-forming mixture to the lower facing material; optionally supplying an upper facing material over the applied foam-forming mixture, at least one facing material comprising a polyisocyanate-impregnated cellulosic material; and foaming and thermally curing the foam-forming mixture. An advancing cover web having a surface nonadherent to the foam may be used in place of the upper facing material. The method may be reversed and a nonadherent material used as the lower web.

Any cellulose material may be treated with polyisocyanate in the production of the facers of the invention. Examples are cellulose fiber material, including kraft pulp, wood pulp, bleached or unbleached paper and paper products, including waste paper, cotton, cotton cloth, and other cotton based materials, bagasse, jute, hemp and sawdust. Cellulosic fibers which are substantially delignified for improved bonding with the polyisocyanates are especially suitable. Any cellulosic material having sufficient porosity for takeup of polyisocyanate may be used. The cellulosic fiber is preferably wet formed into a cohesive sheet or mat.

A preferred cellulosic material is kraft paper or linerboard. Suitable kraft paper or linerboard weighs from 15–200 lbs/3000 ft$^2$ cellulose material. The cellulosic material generally includes a small amount of moisture, whose maximum content is about 10 percent by weight, relative to the weight of the cellulosic material, but can be increased if desired, such as by steam treatment of the fibers to enhance their impregnation by the polyisocyanate. The paper or linerboard is suitably provided in the form of a continuous roll which is unwound for impregnation by the polyisocyanate.

The impregnant used to treat the cellulosic material can be any organic (e.g., aliphatic, aromatic or aryl aliphatic) isocyanate having an average functionality of two or more isocyanate (NCO) groups per molecule. A preferred group of polyisocyanates are the aromatic polyisocyanates, especially methylene-bridged polyphenyl polyisocyanate mixtures. Particularly preferred are 2,4-, and 2,6-toluene diisocyanate and mixtures thereof (TDI), 2,4'-, 2,2'- and 4,4'- diphenylmethane diisocyanate (MDI), polymethylene polyphenylene polyisocyanates (polymeric MDI), and mixtures of the above preferred isocyanates. Heat-labile substituents may be attached to block the NCO groups and thereby inhibit reaction below some specified temperature. The polyisocyanate advantageously is a liquid having a viscosity which permits easy impregnation into the linerboard.

The quantity of polyisocyanate needed for application to a particular cellulosic material can be determined readily by simple experimentation. An application of from about 5 to 30%, preferably about 5 to 20%, w/w of polyisocyanate to cellulosic material is generally employed. The application may be accomplished using neat (undiluted) polyisocyanate or polyisocyanate diluted with an organic solvent, which desirably has low viscosity, toxicity, vapor pressure and flammability. In U.S. Pat. No. 5,140,086, it is reported that use of a solvent can improve the mechanical properties of the impregnated cellulosic material and reduce its cost. A preferred solvent is propylene carbonate. The amount of the solvent is from about 5 to 50, preferably 5 to 20, weight percent, based on the weight of the polyisocyanate.

The polyisocyanate is applied in any manner conducive to thorough impregnation of the cellulosic material. For example, in the usual case involving the cellulosic material in sheet form, the polyisocyanate may be applied to one or both sides of the sheet by dipping, coating, spraying, brushing or by any other convenient are recognized technique.

The impregnated cellulosic material is suitably subjected to a temperature and pressure sufficient to cure the polyisocyanate. The curing can be performed as either a continuous or a batch process. A temperature ranging from about 105° to 245° C., and a pressure range of between about 130 and 1200 psi will be satisfactory for most curing operations. The hot pressing is preferably conducted for a time not exceeding about 5 minutes. The curing may be uncatalyzed or catalyzed by a small amount of catalyst, e.g., about 0.1 to 0.5 weight percent, based on the weight of the polyisocyanate. The catalyst can be introduced during the impregnation step. The finished sheet ready for the inventive lamination process advantageously contains no more than about 6–8, and preferably no more than about 6, weight percent moisture, relative to the weight of the cellulosic material.

The finished cellulosic sheet can be made of one or more plies produced by curing a single lamina or a stack of multiple laminae of polyisocyanate-impregnated cellulosic material. The present invention does not extend to those multiple-ply composites whose thickness and concomitant rigidity render them unacceptable for being unwound from a roll for application as a facer in a continuous foam production. Polyisocyanate-impregnated cellulosic sheets with sufficient flexibility have a thickness of from about 0.003–0.1 in., preferably from about 0.005 to 0.03 in. A suitable density of the sheets ranges from about 15–75 lbs/MSF, more preferably 20–60 lbs/MSF.

The core of the product faced with one or more of the flexible cellulosic sheets may be formed from any available foamable composition which has the capacity of being foamed on a moving substrate. The sheets are particularly suitable for facing rigid polyurethane and polyisocyanurate foams. The latter foams can be prepared by using standard techniques known to those skilled in the art. The preparation involves simply mixing together an organic polyisocyanate with a polyol, catalyst and blowing agent at temperatures ranging from about 0° C. to 150° C.

The polyurethane foams can be prepared by reacting the polyol and polyisocyanate on an essentially 1:0.9 to 1:1.4 equivalent basis. The polyisocyanurate foams of the invention are prepared by reacting the polyisocyanate with a minor amount of the polyol, such as sufficient polyol to provide about 0.1 to 0.71 hydroxyl equivalents of said polyol per equivalent of said polyisocyanate. The foaming reaction may be carried out in the presence of auxiliaries and additives as required (e.g., a surfactant).

The polyisocyanate component employed in the preparation of the cellular polymers can be any of the polyisocyanates known to be useful in the art of polymer formation. The organic di- or polyisocyanates of the invention include aliphatic, cycloaliphatic, araliphatic, aromatic and heterocyclic polyisocyanates and combinations thereof characterized in having two or more isocyanate (NCO) groups per molecule. A preferred group of polyisocyanates are the aromatic ones, especially methylene -bridges polyphenyl polyisocyanate mixtures. Particularly preferred are 2,4- and 2,6- toluene diisocyanate and mixtures thereof (TDI) , 2,4'-, 2,2'- and 4,4'- diphenylmethane diisocyanate (MDI) , polymethylene polyphenylene polyisocyanates (polymeric MDI ) , and mixtures of the above preferred isocyanates. Most particularly preferred are the polymeric MDI's.

In addition to the polyisocyanate, the foam-forming formulation also contains an organic compound containing at least 1.8 or more isocyanate-reactive groups per molecule. Suitable such compounds include polyols, polyamines, polyacids, polymercaptans and like compounds. Preferred isocyanate-reactive compounds are the polyester and polyether polyols. Particularly preferred are polyester polyols, especially aromatic polyester polyols, and mixtures of such polyester polyols and polyether polyols. Among especially preferred polyester polyols are the crude types obtained by the transesterification of crude reaction residues or scrap polyester resins, as disclosed in U.S. Pat. Nos. 4,996,242 and 5,149,722, which disclosures relative thereto are incorporated herein by reference.

Any suitable blowing agent can be employed in the foam compositions. Water, air, nitrogen, carbon dioxide, readily volatile organic substances and/or compounds which decompose to liberate gases (e.g., azo compounds) may be used. Examples of the blowing agents are partially halogenated hydrocarbons, ethers, and esters, hydrocarbons, esters, ethers, and the like. Among usable hydrogen-containing halocarbons are the HCFC's such as 1,1-dichloro-1-fluoroethane (HCFC-141b), 1,1-dichloro-2,2,2-trifluoroethane (HCFC-123), monochlorodifluoromethane (HCFC-22), 1-chloro-1,1-difluoroethane (HCFC-142b) , 1,1-difluoroethane (HCFC-152a), and 1,1,1,2-tetrafluoroethane (HFC-134a) .

The blowing agents are employed in an amount sufficient to give the resultant foam the desired bulk density which is generally between 0.5 and 10, preferably between 1 and 5, and most preferably between 1.5 and 2.5, pounds per cubic foot. The blowing agents generally comprise from 1 to 30, and preferably comprise from 5 to 20, weight percent of the composition.

Catalysts are advantageously employed in the foam-forming mixture for accelerating the isocyanate-hydroxyl reaction. Such catalysts include organic and inorganic acid salts and organometallic derivatives of various metals, as well as phosphine and tertiary organic amines. In the preparation of the polyisocyanurate rigid foams, any catalysts known to catalyze the trimerization of isocyanates to form isocyanurates, and to catalyze the reaction of isocyanate groups with hydroxyl groups to form polyurethanes, can be employed. The catalysts generally comprise from about 0.1 to 20, and preferably from 0.3 to 10, weight percent of the total foam-forming composition.

Any of the known surfactants of the prior are may be useful as foam stabilizers. Successful results have been obtained with silicone/ethylene oxide/propylene oxide copolymers as surfactants. Generally, the surfactant comprises from about 0.05 to 10 and preferably from 0.1 to 6, weight percent of the foam-forming composition.

Other additives may also be included in the foam formulations. Included are processing aids, viscosity reducers such as 1-methyl-2-pyrrolidinone, propylene carbonate, nonreactive and reactive flame retardants, such as tris(2-chloroethyl)-phosphate, dispersing agents, reinforcing agents, plasticizers, mold release agents, stabilizers against aging and weathering, compatibility agents, fungistatic and bacteriostatic substances, dyes, fillers and pigments, and other additives. The use of such additives is well known to those skilled in the art.

In the manufacture of the rigid cellular polyurethanes and polyisocyanurates, two preformulated components, commonly called the A-component and the B-component, are generally employed. Typically, the A-component contains the isocyanate compound that must be reacted with the polyol of the B-component to form the foam, and the remaining foam-forming ingredients are distributed in these two components or in yet another component or components. All components are mixed and deposited onto the advancing facing sheet.

One preferred method of utilizing the isocyanate-impregnated facers involves their application on a restrained-rise production line. In this process, a conveyor system transports at least one but preferably two continuous webs of the isocyanate-impregnated cellulosic material or composite thereof fed from supply rolls to the point of delivery of the finished foam board. The restrained-rise process employs conveyor belts 54 and 55 to restrain the expanding foam. Both endless conveyors can comprise a series of articulated platens, such as described in U.S. Pat No 4,043,719, whose disclosure is incorporated herein by reference. The platens are supported on and run over rollers.

Referring now to the drawings and in particular to FIG. 1, there is shown schematically an apparatus 10 suitable for the restrained-rise process. The apparatus 10 comprises tanks 11, 12 and 13 for containing the foaming ingredients and additives such as blowing agent, surfactant, etc., each respectively connected to outlet lines 14, 15 and 16. The lines 14, 15 and 16 form the inlet to metering pumps 17, 18 and 19. The pumps 17, 18 and 19 discharge respectively through lines 20, 21 and 22 which are in turn respectively connected to flexible lines 23, 24 and 25. The flexible lines 23, 24 and 25 discharge to mixing head 29. The apparatus 10 is also provided with a roll 30 of isocyanate-impregnated kraft paper 31 of the invention and a roll 30' of another isocyanate-impregnated kraft paper 31'. The apparatus 10 is also provided with metering rolls 32 and 33 and an oven 35 provided with vents 36 and 36' for introducing and circulating hot air. The apparatus 10 is also provided with pull rolls 38 and 39 each of which preferably has a flexible outer sheath 40 and 41. The apparatus 10 is also provided with cutting means 44 for severing the structural laminate produced by this process into finite lengths thereby producing discrete panels.

In operation, the tanks are charged with the foam-forming mixture in whatever manner is convenient and preferred for the specific polymer. For instance, for a urethane foam, the polyol can be in one tank, the polyisocyanate in another and catalyst in a third. Other polymers such as polyvinyl chloride can be used as a dispersion in plasticizers and a blowing agent introduced. Or polyvinyl chloride can be extruded as can polystyrene, cellulose acetate and the polyolefins among others. Rubber and urea-formaldehyde can be frothed and admixed with the appropriate blowing agent and surfactant. The speeds of the pumps 17, 18 and 19 are adjusted to give the desired ratios of the ingredients in the tanks 11, 12 and 13. These ingredients pass respectively through lines 20, 21 and 22 as well as lines 23, 24 and 25 whereupon they are mixed in the mixing head 29 to form the liquid foam-forming mixture 45 which contacts kraft paper 31 fed from the roll 30 toward the nip 34 between the two rotating metering rolls 32 and 33.

By virtue of rotation of the pull rolls 38 and 39, the lower isocyanate-impregnated kraft paper 31 is pulled from the roll 30, and the upper isocyanate-impregnated kraft paper 31' is pulled from the roll 30' The two kraft papers having the foam-forming mixture 45 therebetween pass through the nip 34 of the two rotating metering rolls 32 and 33. The mixing head 29 is caused to move back and forth, normal to the running length of the kraft paper by virtue of a reciprocating means 49. In this manner, an even amount of foam-forming mixture 45 can be maintained upstream from the nip 34 and in contact with the kraft paper 31. The velocities of the upper and lower kraft papers are substantially equal as they pass between the nip 34 of the two rolls.

The composite structure 48 next passes into oven 35 and while in the oven the foam-forming mixture expands in an expansion zone 37. Lower and upper endless conveyor belts 54 and 55, each comprising a series of platens, are positioned in oven 35 to contain the expanding foam therebetween. Lower paper 31 and upper paper 31' are drawn along the opposed surfaces of conveyors 54 and 55, respectively.

The distance between the horizontal planes of the facing portions of conveyors 54 and 55 can be preset to determine the thickness of the final board. This distance is suitably less than the combined thickness of facers 31 and 31' and the foam which would otherwise result if the mixture 45 were allowed to foam unrestrictedly. As the foaming mixture expands upwardly, it comes into contact with paper 31' and forces the paper facer against conveyor 55, causing the facer to assume a substantially planar disposition on the upper correspondingly planar surface of foam 51. The foam becomes securely interlocked with the kraft paper facing sheets on its major surfaces.

The foam expansion is initiated by heat generated in an exothermic reaction between the components 26, 27 and 28 of the foam-forming mixture 45 and is regulated by heat added to the oven 35 by the hot air from vents 36 and 36'. The temperature within the oven 35 is controlled by varying the temperature of the hot air from vents 36 and 36' in order to insure that the oven temperature is maintained within the suitable range, as, e.g., from 100° F. to 350° F. and preferably 150° F. to 250° F., to cure the foam and promote the interaction between the foam chemicals and kraft papers for improved adhesion at the interface.

The expanding foam 51, under continuing influence of the heat added to the oven 35 by the controlled introduction of hot air from vents 36 and 36', cures to form the structural laminate 52 of this invention. The structural laminate 52 then leaves the oven 35, passes between the pull rolls 38 and 39, and is cut by cutting means 44 into finite lengths thereby forming discrete panels 53 and 53' of the structural laminate 52.

The confining pressure exerted by the conveyors of the restrained-rise process contributes significantly to improved flatness of the resultant structural laminates. This pressure counteracts the tendency of thicker isocyanate-impregnated facers when unconfined to afford unacceptably wavy surfaces to the foamed laminates. The problem intensifies as the finished laminate becomes thinner and/or its facing material becomes thicker. For example, the use of facers having a thickness of about 0.025 inch or greater has been found to lead to excessive surface wariness in attempts to produce laminates which are less than about 1 inch thick by the restrained-rise process. The situation can be ameliorated by equilibration of the facer's moisture content over its entire field. The equilibration can be performed by techniques known to those skilled in the art. Accordingly, the restrained-rise process can be carried out to produce acceptably flat structural laminates which are less than 1 inch thick and faced on both major surfaces with relatively thick (e.g., >0.02 inch) polyisocyanate-impregnated facers by providing that the moisture content of the facets employed in the process is substantially evenly distributed throughout the extent of the facers.

Figure 2:
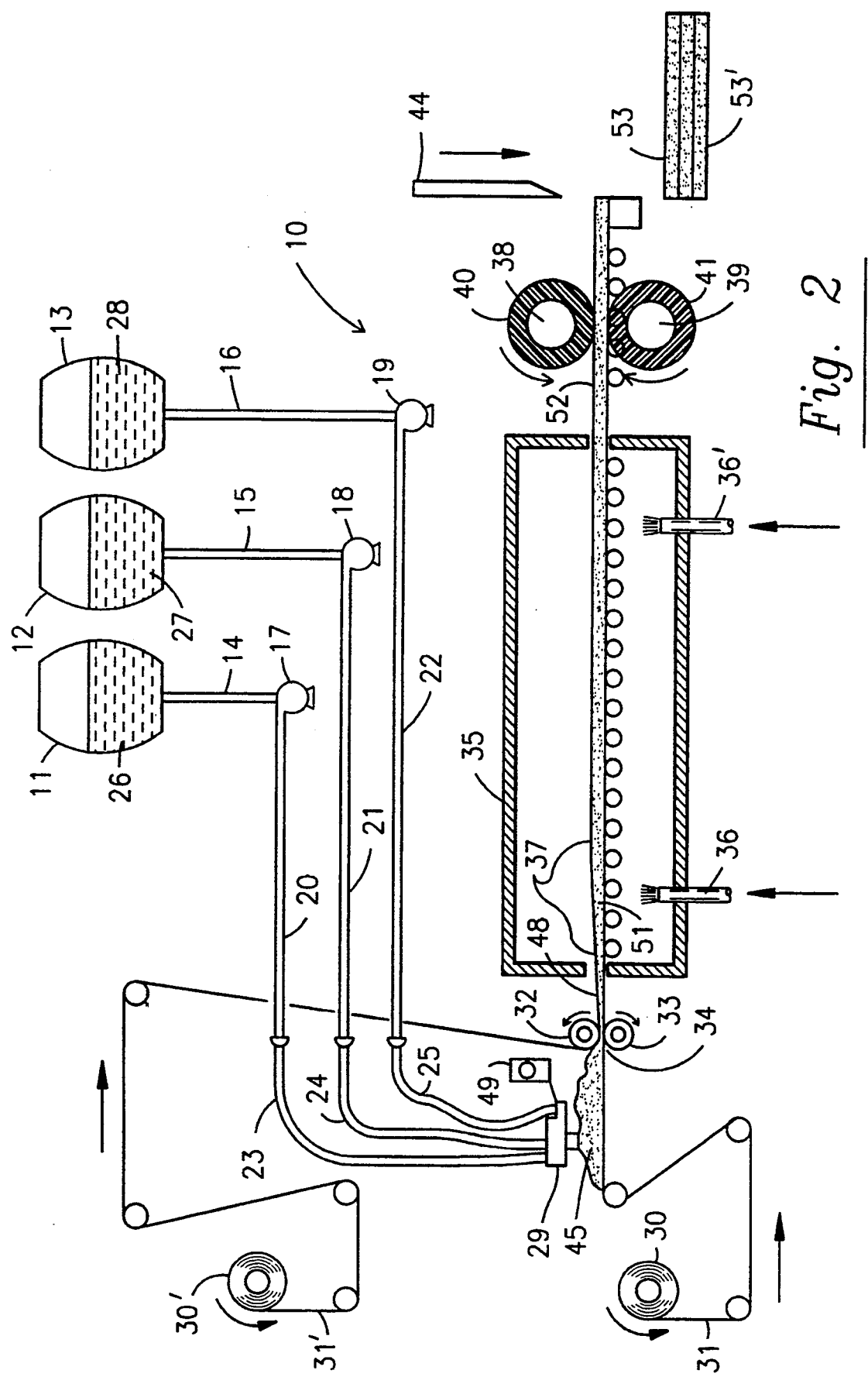
FIG. 2 is a schematic elevation of an apparatus suitable for practicing the process of the invention in a free-rise mode.

Another preferred method for manufacturing structural laminates in accordance with the invention is the free-rise line schematically shown in FIG. 2. This process can be accomplished generally in the same manner and with the same material and apparatus as the above-described restrained-rise system, with certain exceptions. Specifically, the free-rise process allows the expanding foam to rise without confinement by conveyor belts or the like.

An absence of conveyor belts to confine the expanding foam in the free-rise process exacerbates the tendency of impregnated facing sheets containing an unevenly distributed moisture content to yield structural laminates with excessively undulating surfaces. However, equilibration of the facing sheets' moisture content leads to the production by the free-rise process of satisfactorily flat structural laminates having a wide range of facer and finished laminate thicknesses. Since exceedingly high production rates are attainable through the free-rise process, characterized by line speeds of 200-250 ft/min, the suitability of this process for utilizing the polyisocyanate-impregnated facers of the invention is significant commercially. The free-rise process is particularly useful in the production of structural laminates having a polyisocyanate-impregnated facer or facers which are less than 0.02" in thickness, more preferably 0.015" or less. A typical wall insulation producible by the process has a thickness in the range from 0.5-1 in and comprises a rigid polyisocyanurate foam core between two 0.013 in thick facers.

Single or multiple sheets of the polyisocyanate-impregnated facing material can be adhered to either one or both of the major surfaces of the foam core in accordance with the continuous process of the present invention. The polyisocyanate-impregnated sheet also can be used in the form of a composite with one or more different materials incorporated before, during or after the continuous lamination process to augment the facer's properties. For example, the insulating efficiency can be improved by combining the polyisocyanate-impregnated facer with a layer or sheet of a substantially air- and/or moisture-impermeable material, which is preferably positioned in the finished laminate between the foam core and impregnated facer. Any suitable impermeable material may be used, such as the barrier polymers disclosed in U.S. Pat. No. 4,764,420 and metallic foil sheets (e.g., aluminum). Examples of barrier polymers are polyethylene, nitrile resins and halogenated vinyl resins, such as polyvinyl chloride and vinylidene chloride copolymers. There are various ways to combine the impermeable barrier material and polyisocyanate-impregnated facer, including lamination prior to the continuous foaming operation and application during said operation, such as by unrolling a sheet for placement interiorly of the impregnated facer. Other protective and/or decorative surface layers may be used on the polyisocyanate-impregnated facers to make them waterproof, fireproof, etc. Adhesives may be required to bond such layers to the structural laminate.

The structural laminates produced in accordance with the inventive method can be used in various ways to insulate and brace buildings. The application of the laminates to building frames is described in U.S. Pat. No. 5,220,760. Using conventional fastening means, such as chemical fasteners (adhesives) or a combination of chemical fasteners and mechanical fasteners (e.g., nails or staples), the laminates can be mounted to a building framework to provide extraordinary racking shear strengths.

The combination of desirable properties of the structural laminates, including their superior strength and durability, make them especially useful for both wall and roof insulation purposes. The facets render the board surfaces particularly tough and impact resistant, and consequently the insulation boards are characterized by good handleability and serviceability in general. There is an exceptionally good bond between the cellulosic facers and the foam core. The bond is achievable without resort to the use of special adhesive materials conventionally used in the industry. The faced composite's outstanding resistance to delamination and to changes in dimensions with aging and exposure to adverse conditions qualifies the composite for various heavy-duty applications, including use in roof insulation without additional protection such as a fiberboard overlay.

The present invention is further illustrated by the following examples in which all parts and percentages are by weight unless otherwise indicated.

EXAMPLE 1

This example illustrates the continuous production of structural laminates by reference to FIG. 1 of the drawings.

The structural laminates were prepared by a restrained-rise process from the ingredients and quantities thereof shown in the following Table I.

TABLE I

| INGREDIENTS | PARTS |
|---|---|
| A-Component: | |
| Isocyanate[1] | 191 |
| CFC-11 | 52 |
| Surfactant[2] | 2.5 |
| B-Component: | |
| Polyol[3] | 109 |
| C-Component: | |
| Potassium octoate | 7.68 |
| Potassium acetate | 1.29 |
| N,N-dimethylcyclohexylamine | .53 |
| Water | .24 |

Footnotes:
[1]Isocyanate = polymethylene polyphenyl isocyanate which has an equivalent weight of 140, an acidity of .06% HCl, and a viscosity of 2100 centipoises at 25° C., and is available from Miles Inc. under the trademark MONDUR MR-200.
[2]Surfactant = silicone supplied by the Union Carbide Corporation under the trademark Y-10222.
[3]Polyol = aromatic polyester polyol having an equivalent weight of 240 and a viscosity at 25° C. of 3000 cps, and is supplied by Cape Industries under the trademark Terate 254.

Components A, B and C were pumped from tanks 11, 12 and 13, respectively. Top facer 31' and bottom facer 31 were each a polyisocyanate-impregnated cellulosic material having a thickness of 0.023"±0.002". Rolls 30' and 30 of the facing material were mounted and threaded to the conveyor.

With the oven 35 heated to ~190° F., the facers were fed toward the nip of metering rolls 32 and 33, and the pumps 17, 18 and 19 were started to discharge the contents of tanks 11, 12 and 13 into the respective feed lines to carry the ingredients to the mixing head 29. The mixing head 29 deposited the foam forming mixture onto the lower facer and both upper and lower facers and foamable mixture were then conveyed into the oven to produce 1 inch thick laminated structural panels 53,53' having a trimmed width of 48 inches.

Various properties of the resulting structural laminates are reported in Table II below. The results of Table II reveal that the laminates possess a combination of desirable properties. Additionally, there was excellent facer/foam adhesion and the field of the boards was flat, but edge wariness occurred at the outer few inches of the laminates.

TABLE II
PROPERTIES OF STRUCTURAL LAMINATES

| Core Foam | |
|---|---|
| Density, pcf | 1.70 |
| Closed Cells, % | 89.34 |
| Friability, % wt loss | 2.91 |
| Compressive Strength, psi | 27 |
| Flexural Strength, psi MD/TD | 34/44 |
| Water Absorption, % by Vol. | 1.79 |
| Structural Laminate | |
| In-place Density, pcf | 2.10 |
| Compressive Strength, psi | 26 |
| Flexural Strength, psi MD/TD | 280/237 |
| Water Absorption, % by Vol. | 2.73 |
| k-Factor, 30 days Btu-in/hr-ft$^2$-°F. | 0.167 |
| Racking Strength, lbs @ failure | |
| glue/nails | 5500 |
| nails only | 3000 |

EXAMPLE 2

This example illustrates the utilization of moisture equilibrated, polyisocyanate-impregnated facers to produce structural laminates by the restrained-rise process of the invention.

The structural laminates were prepared according to the procedure of Example 1 from the ingredients and quantities thereof shown in the following Table III.

TABLE III

| INGREDIENTS | PARTS |
|---|---|
| A-Component: | |
| Isocyanate[1] | 191 |
| CFC-11 | 52 |
| Surfactant[2] | 2.5 |
| B-Component: | |
| Polyol[3] | 109 |
| C-Component: | |
| Potassium octoate | 7.68 |
| Potassium acetate | 1.29 |
| N,N-dimethylcyclohexylamine | .53 |
| Water | .24 |

Footnotes:
[1] Of Example 1.
[2] Of Example 1.
[3] Of Example 1.

The laminated structural panels, whose upper and lower facers were each a 0.023±0.002 inch thick polyisocyanate-impregnated cellulosic material, were produced in thicknesses of ⅜–¾ inch. Various properties of the laminates are shown in the following Table IV. The laminates exhibited no significant variation in edge caliper, with only slight tapering across the board width attributable to unevenness of the confining platens used in the restrained-rise process. The problem of edge waviness was substantially eliminated by the use of moisture equilibrated facers.

TABLE IV
PROPERTIES OF STRUCTURAL LAMINATES

| Core Foam | |
|---|---|
| Density, pcf | 1.75 |
| Closed Cells, % | 90 |
| Friability, % wt loss | 2.5 |
| Compressive Strength, psi | 26 |
| Flexural Strength, psi MD/TD | 34/44 |
| Water Absorption, % by Vol. | 1.7 |
| Dimensional Stability, % Change (MD + TD/2, 14 days, 5" × 5") | |
| 70° C./95% RH | 5.66 |
| 125° C. | — |
| −40° F. | 0.03 |
| Structural Laminate | |
| In-place Density, pcf | 1.85 |
| Compressive Strength, % psi | 27 |
| Flexural Strength, psi MD/TD | 282/246 |
| Water Absorption, % by Vol. | 2.6 |
| Dimensional Stability, % Change (MD + TD, 14 days, 5" × 5") | |
| 70° C./95% RH | 1.75 |
| 125° C. | 5.99 |
| −40° F. | 0.07 |
| k-Factor, 180 days Btu-in/hr-ft$^2$-°F. | .158 |

Racking strength evaluations, which were conducted on laminated structural panels manufactured in accordance with the restrained-rise process of the invention, yielded the results shown in the following Table V. The glued and nailed panels provide a racking strength which meets building code requirements for use as corner bracing or in shear wall construction. The data reveal the importance of gluing to attain superior racking strength values.

TABLE V
STRUCTURAL SHEATHING RACKING STRENGTH

| Construction[1] | Racking Strength lbs. @ failure |
|---|---|
| 1. Nails - 7/16" diameter, 2" galvanized, 3" o.c. perimeter; 6", o.c. field Adhesive - PL400[2], ⅜" bead | 7000 |
| 2. Nails - 7/16" diameter, 2" galvanized, 6" o.c. perimeter; 12" o.c. field Adhesive - PL400[2], ⅜" bead | 8200 |
| 3. Nails - 8d annular ring/15/16" cap, 6" o.c. perimeter; 12" o.c. field Adhesive - None | 2000 |

Footnotes:
[1] Tests conducted on 2" × 4" stud walls; nails spaced at the center-to-center (o.c.) distances given in the table; 16" o.c. Wood was #2 southern yellow pine or birch/fir; 7/16" diameter relates to the nail head diameter.
[2] PL400 = Conventional construction adhesive supplied by Chemrex Inc.

EXAMPLE 3

This example illustrates the continuous production of structural laminates of the invention by reference to FIG. 2 of the drawings.

The structural laminates were prepared by a free-rise process from the ingredients and quantities thereof shown in the following Table VI.

TABLE VI

| INGREDIENTS | PARTS |
|---|---|
| A-Component: | |
| Isocyanate[1] | 185.7 |
| HCFC-141b | 44 |
| Surfactant[2] | 2.2 |
| B-Component: | |
| Polyols[3] | 114.3 |
| C-Component: | |
| 2,4,6-tris[dimethylaminomethyl]phenol | 1.2 |
| N-hydroxy-isopropyl methyl ammonium salt of formic acid | 1.2 |

TABLE VI-continued

| INGREDIENTS | PARTS |
| --- | --- |
| Polyethylene glycol | 2.37 |
| Potassium octoate | .84 |
| Diethylene glycol | .36 |

Footnotes:
[1]Of Example 1.
[2]Of Example 1.
[3]Polyol = aromatic polyester polyol having an equivalent weight of 230 and a viscosity at 25° C. of 3500 cps, and is supplied by Cape Industries under the trademark 2541.

Production of the structural laminates was carried out basically as described in Example 1 except that the oven 35 did not contain the confining platens of the restrained-rise process. Laminates were manufactured in thicknesses of 0.5", 0.75" and 1" with a 0.013±0.002 inch thick, moisture equilibrated cellulosic material of the invention on each major surface. The facers adhered well to the foam core and were suitably flat over their entire extension. Other properties of the laminates are shown in the

TABLE VII

PROPERTIES OF STRUCTURAL LAMINATES

| | ½" board | ¾" board | 1" board |
| --- | --- | --- | --- |
| Core Foam | | | |
| Density, pcf | 1.81 | 1.72 | 1.70 |
| Structural Laminate | | | |
| Compressive Strength, psi | 21 | 23 | 21 |
| Flexural Strength, psi MD/TD | 289/237 | 153/145 | 100/94 |
| Water Absorption, % by Vol. | 2.00 | 1.41 | 1.06 |
| k-Factor, 90 days/140° F. Btu-in/hr-ft$^2$-°F. | .174 | .175 | .175 |
| Water Vapor Transmission, perms | 1.94 | 1.55 | 1.35 |
| Dimensional Stability | | | |
| 14 days at 158° F., 97% RH | | | |
| % change in length (% M) | 1.31 | 1.26 | 1.43 |
| % change in width (% T) | 1.77 | 1.95 | 1.35 |
| Average (% M + % T)/2 | 1.54 | 1.60 | 1.39 |
| 14 days at −40° F. | | | |
| % change in length (% M) | 0.00 | 0.00 | 0.00 |
| % change in width (% T) | 0.04 | 0.04 | 0.04 |
| Average (% M + % T)/2 | 0.02 | 0.02 | 0.02 |
| 14 days at 200° F. | | | |
| % change in length (% M) | 0.29 | 0.25 | 0.47 |
| % change in width (% T) | 0.40 | 0.27 | 0.52 |
| Average (% M + % T)/2 | 0.35 | 0.26 | 0.49 |
| Surface Burning Characteristics of Core | | | |
| Flame Spread Index | — | — | 18.3 |
| Smoke Index | — | — | 124 |
| Racking Strength, lbs @ failure | | | |
| glue/nails | 3500 | — | — |

We claim:

1. A method for continuously producing an insulation board comprising a rigid plastic foam core having two major surfaces and a facing material on at least one of the major surfaces, the method comprising:
   (a) conveying a facing material along a production line for attachment to one major surface of the core,
   (b) applying a foam-forming mixture to the facing material,
   (c) optionally conveying a second facing material along the line for attachment to the other major surface of the core, at least one facing material comprising a cellulosic sheet or a composite of a cellulosic sheet with an air- and/or moisture-impermeable material, the air- and/or moisture-impermeable material being interposed between the cellulosic sheet and the foam-forming mixture or being positioned on the outside surface of the cellulosic sheet, wherein the cellulosic sheet has been impregnated with about 5 to 20% by weight of polyisocyanate, and the polyisocyanate has been cured, and the cellulosic sheet is (i) sufficiently flexible so that it can be supplied from a roll for conveyance along the production line, and (ii) has a moisture content not exceeding about 10 percent, the moisture being substantially evenly distributed throughout the cellulosic sheet, and
   (d) foaming and curing the faced foam-forming mixture.

2. The method of claim 1 wherein the moisture content of the cellulosic sheet is no greater than about 6 weight percent.

3. The method of claim 1 wherein the cellulosic sheet is less than 0.03 in thick.

4. The method of claim 1 wherein the foam-forming mixture comprises a mixture for forming a rigid polymer foam selected from the group consisting of polyurethane, polyisocyanurate, phenolic, rubber, polyvinyl chloride, urea-aldehyde, melamine-aldehyde, polystyrene, polypropylene, polyethylene, cellulose acetate, epoxy, acrylonitrile-butadiene-styrene copolymer and silicone foams.

5. The method of claim 1 wherein the air- and/or moisture-impermeable material is a barrier polymer.

6. The method of claim 1 wherein the foam-forming mixture comprises a mixture for forming a rigid polymer foam selected from the group consisting of polyurethane and polyisocyanurate foams.

7. The method of claim 6 wherein the density of the foam core is between 1.5 and 2.5 pounds per cubic foot.

8. The method of claim 6 wherein the foam-forming mixture comprises a polyisocyanate, a polyol, a surfactant, a catalyst, and a blowing agent selected from the group consisting of water, air, nitrogen, carbon dioxide, readily volatile organic substances, compounds which decompose to liberate gases and combinations thereof.

9. The method of claim 1 for continuously producing an insulation board having cellulosic sheets on both major surfaces of the foam core comprising:
   (a) conveying at least one lower cellulosic sheet along the production line,
   (b) depositing the foam-forming mixture on the lower cellulosic sheet,
   (c) placing at least one advancing upper cellulosic sheet on the deposited foam-forming mixture to form an advancing sandwich of upper and lower cellulosic sheets and intermediate foam-forming mixture, and
   (d) foaming and curing the foam-forming mixture in contact with, the cellulosic sheets to form a rigid plastic foam core covered on both major surfaces with the cellulosic sheets.

10. The method of claim 9 wherein:
   (a) the advancing sandwich of upper and lower cellulosic sheets and intermediate foam-forming mixture is passed through the nip of two rotating rolls to meter the amount of the foam-forming mixture, and
   (b) the sandwich is thereafter passed from the nip of the two rotating rolls into a heated expansion zone, whereby the foam-forming mixture expands and cures in contact with the cellulosic sheets to form the rigid plastic foam core covered with the cellulosic sheets.

11. The method of claim 10 wherein the moisture content of each cellulosic sheet is no greater than about 6 weight percent.

12. The method of claim 10 wherein each cellulosic sheet is less than 0.03 in thick.

13. The method of claim 10 wherein the foam-forming mixture comprises a mixture for forming a rigid polymer foam selected from the group consisting of polyurethane and polyisocyanurate foams.

14. The method of claim 10 wherein the foam-forming mixture comprises a mixture for forming a rigid polyisocyanurate foam.

15. The method of claim 10 wherein the heated expansion zone contains a pair of substantially horizontal, vertically spaced continuous conveyors to limit the maximum distance the outer surfaces of the cellulosic sheets can move apart, whereby the foam-forming mixture expands to the extent permitted by the conveyors and the resultant foam cures in contact with the cellulosic sheets to form the rigid plastic foam core covered with the cellulosic sheets.

16. The method of claim 15 wherein the moisture content of each cellulosic sheet is no greater than about 6 weight percent and each cellulosic sheet is less than 0.03 in thick.

17. The method of claim 15 wherein the foam-forming mixture comprises a mixture for forming a rigid polymer foam selected from the group consisting of polyurethane and polyisocyanurate foams.

18. The insulation board produced by the method of claim 1.

19. The insulation board produced by the method of claim 10.

20. The insulation board produced by the method of claim 15.

21. The method of claim 1 wherein the air- and/or moisture-impermeable material is positioned on the outside surface of the cellulosic sheet and is selected from the group consisting of a barrier polymer and a metallic foil sheet.

22. The method of claim 21 wherein the air- and/or moisture-impermeable material comprises an aluminum foil sheet.

23. The method of claim 22 wherein the second facing material is conveyed along the line and attached to the core, and each facing material comprises a composite of the polyisocyanate-impregnated cellulosic sheet with an aluminum foil sheet positioned on the outside surface of the cellulosic sheet.

24. The method of claim 23 wherein the foam-forming material comprises a mixture for forming a rigid polymer foam selected from the group consisting of polyurethane and polyisocyanurate foams.

25. The method of claim 24 wherein the foam-forming material comprises a mixture for forming a rigid polyisocyanurate foam.

26. The insulation board produced by the method of claim 21.

27. The insulation board produced by the method of claim 23.

28. The insulation board produced by the method of claim 24.

29. The insulation board produced by the method of claim 25.

* * * * *